(12) United States Patent
Xu et al.

(10) Patent No.: US 12,043,183 B2
(45) Date of Patent: Jul. 23, 2024

(54) AVN MONITOR DRIVE UNIT FOR VEHICLE

(71) Applicant: HYUNDAI MOBIS CO., LTD., Seoul (KR)

(72) Inventors: Yin Peng Xu, Yantai (CN); Ju Hwan Park, Hwaseong-si (KR); Liu Wei, Yantai (CN); Wang Zhen, Yantai (CN)

(73) Assignee: HYUNDAI MOBIS CO., LTD., Seoul (KR)

( * ) Notice: Subject to any disclaimer, the term of this patent is extended or adjusted under 35 U.S.C. 154(b) by 200 days.

(21) Appl. No.: 17/543,088

(22) Filed: Dec. 6, 2021

(65) Prior Publication Data

US 2022/0176890 A1 Jun. 9, 2022

(30) Foreign Application Priority Data

Dec. 7, 2020 (KR) .......................... 10-2020-0169958

(51) Int. Cl.
| | |
|---|---|
| *B60K 35/00* | (2024.01) |
| *B60K 35/22* | (2024.01) |
| *B60R 11/02* | (2006.01) |
| *B60K 35/28* | (2024.01) |
| *B60R 11/00* | (2006.01) |

(52) U.S. Cl.
CPC .......... *B60R 11/0235* (2013.01); *B60K 35/00* (2013.01); *B60K 35/22* (2024.01); *B60K 35/28* (2024.01); *B60K 2360/166* (2024.01); *B60R 2011/0005* (2013.01); *B60R 2011/0085* (2013.01); *B60R 2011/0092* (2013.01)

(58) Field of Classification Search
CPC ...... B60K 2370/152; B60K 2370/1523; B60K 2370/166; B60K 2370/67; B60K 2370/73; B60K 2370/739; B60K 2370/744; B60K 35/00; B60K 37/04; B60R 11/0235; B60R 2011/0005; B60R 2011/0085; B60R 2011/0092

USPC ........................................................ 348/837
See application file for complete search history.

(56) References Cited

U.S. PATENT DOCUMENTS

| | | | |
|---|---|---|---|
| 2002/0001049 A1 | 1/2002 | Endo et al. | |
| 2003/0122782 A1* | 7/2003 | Yamaguchi | ......... B60R 11/0235 345/158 |

(Continued)

FOREIGN PATENT DOCUMENTS

| | | |
|---|---|---|
| CN | 101042941 A | 9/2007 |
| CN | 107985216 A | 5/2018 |

(Continued)

OTHER PUBLICATIONS

Office Action issued on Jun. 9, 2023 in corresponding Chinese patent application No. 202011565628.8.

*Primary Examiner* — Kathleen M Walsh
(74) *Attorney, Agent, or Firm* — Novo TechIP International PLLC (57) ABSTRACT

Provided is an audio-video-navigation (AVN) monitor drive unit for a vehicle, which is configured to tilt an AVN monitor coupled to a crash pad in a direction toward a passenger seat. The AVN monitor drive unit includes a monitor assembly, a hinge bracket slidably positioned at a rear of the monitor assembly, and a tilting portion configured to connect the monitor assembly and the hinge bracket to each other and tilt the monitor assembly from the hinge bracket.

20 Claims, 8 Drawing Sheets

(56) References Cited

U.S. PATENT DOCUMENTS

| | | | |
|---|---|---|---|
| 2003/0125873 A1* | 7/2003 | Yamaguchi | B60K 35/00 |
| | | | 345/204 |
| 2005/0056734 A1 | 3/2005 | Lee | |
| 2006/0203013 A1* | 9/2006 | Chuo | B60R 11/0235 |
| | | | 345/649 |
| 2018/0304749 A1* | 10/2018 | Cho | B60K 37/06 |
| 2019/0077357 A1* | 3/2019 | Rupp | B60R 21/21 |
| 2020/0116999 A1* | 4/2020 | Watanabe | G02B 5/003 |
| 2020/0233216 A1* | 7/2020 | Liesener | B60R 1/12 |
| 2021/0276419 A1* | 9/2021 | Ng | B60K 37/06 |
| 2022/0144085 A1* | 5/2022 | Lian | F16M 13/02 |

FOREIGN PATENT DOCUMENTS

| | | | | |
|---|---|---|---|---|
| EP | 2574491 B1 * | 12/2018 | | B60K 35/00 |
| JP | 09-301085 A | 11/1997 | | |
| JP | 2001030849 A | 2/2001 | | |
| KR | 10-0824604 B1 | 4/2008 | | |
| KR | 10-0821678 B1 | 5/2008 | | |
| KR | 100821678 B1 * | 5/2008 | | |
| KR | 101459942 B1 | 11/2014 | | |

* cited by examiner

AVN MONITOR DRIVE UNIT FOR VEHICLE

CROSS-REFERENCE TO RELATED APPLICATIONS

This application claims priority to and the benefit of Korean Patent Application No. 10-2020-0169958, filed on Dec. 7, 2020, the disclosure of which is incorporated herein by reference in its entirety.

BACKGROUND OF THE INVENTION

1. Field of the Invention

The present invention relates to an audio-video-navigation (AVN) monitor drive unit, and more particularly, to an AVN monitor drive unit for a vehicle which is configured to tilt an AVN monitor coupled to a crash pad toward a passenger seat.

2. Discussion of Related Art

Generally, as vehicles have been upgraded, the number of vehicles in which an audio-video-navigation (AVN) system is embedded in and fixed to a center fascia located between a driver seat and a passenger seat has gradually increased.

The AVN system provides a driver with much more convenience by providing TV broadcasts while a vehicle runs or displaying map information or the like through introduction of a navigation system to secure a driver's convenience.

Also, in the AVN system, not only an audio and visual or navigation system is mounted but also a monitor configured to display audio and visual or navigation system-related information is provided to allow a driver to visually recognize necessary information with ease.

However, generally, the AVN system is designed on the basis of the driver to facilitate manipulation of the driver for above-mentioned reasons.

That is, since the AVN system is close to a direction in which the driver seat faces or a monitor screen faces the front, a passenger sitting in the passenger seat has inconvenience in watching or using the AVN monitor.

BRIEF SUMMARY OF THE INVENTION

The present invention is directed to providing an audio-video-navigation (AVN) monitor drive unit configured to allow a passenger sitting in a passenger seat to easily watch and manipulate an AVN monitor.

Purposes, advantages, and features and methods for achieving them in addition to the above-mentioned purposes of the present invention will be made clear from embodiments described in detail below with reference to the accompanying drawings.

According to one aspect of the present invention, there is provided an AVN monitor drive unit for a vehicle. The AVN monitor drive unit includes a monitor assembly, a hinge bracket slidably disposed in the rear of the monitor assembly, and a tilting portion configured to connect the monitor assembly and the hinge bracket to each other and tilt the monitor assembly from the hinge bracket.

The monitor assembly may include a screen portion electrically connected to a connector configured to receive an output signal from the outside and configured to receive the output signal from the outside through the connector and output a variety of pieces of information, a monitor frame disposed in the rear of the screen portion and configured to accommodate the screen portion, a bracket cover having a quadrangular frame shape and extending rearward from a rear surface of the monitor frame, and a monitor bracket disposed in the bracket cover and mounted on a rear surface of the screen portion.

The monitor frame may include a through-hole configured to communicate with the bracket cover having the quadrangular frame and expose the monitor bracket outward.

The monitor bracket may include a first base portion forming a body, a pair of first rotation support portions spaced apart from each other in a width direction and coupled to a rear surface of the first base portion, a pair of second rotation support portions spaced apart from each other in a width direction of the first base portion at positions spaced in a longitudinal direction from the first rotation support portions and coupled to the rear surface of the first base portion, and a third rotation support portion coupled to the rear surface of the first base portion between the first rotation support portion and the second rotation support portion.

A through-hole through which the connector passes may be formed in the first base portion between the first rotation support portion and the third rotation support portion.

The hinge bracket may include a second base portion forming a body and spaced rearward at a distance apart from the monitor assembly, an extension portion extending from a periphery of the second base portion in a direction in which the monitor assembly is disposed, a pair of first rotation support holes formed in the extension portion at positions corresponding to the first rotation support portions, a pair of second rotation support holes formed in the extension portion at positions spaced apart from the first rotation support holes in a longitudinal direction, and a third rotation support hole formed in the extension portion in a direction opposite to a direction in which the first rotation support holes are disposed on the basis of the second rotation support holes.

The extension portion may be inserted into the bracket cover having the quadrangular frame shape, and the monitor assembly may slide along the extension portion.

The tilting portion may include a pair of first rotation members each having one end coupled to the first rotation support portion and the other end coupled to the first rotation support hole, a pair of second rotation members each having one end coupled to the second rotation support portion and the other end coupled to the second rotation support hole, and a drive member having one end coupled to the third rotation support portion and the other end coupled to the third rotation support hole.

A length of the first rotation member may be shorter than a length of the second rotation member.

The drive member may be selectively variable and space the monitor assembly from the hinge bracket selectively.

The first rotation member may include a first fixing portion rotatably coupled to each of the first rotation support portions and a second fixing portion rotatably coupled to each of the first rotation support holes.

The second rotation member may include a pair of third fixing portions rotatably coupled to the second rotation support portions and a pair of fourth fixing portions rotatably coupled to the second rotation support holes.

The drive member may include a motor housing disposed between the pair of second rotation members and having one end rotatably coupled to the hinge bracket, a motor portion accommodated in the motor housing, and a screw bar accommodated in the motor housing and coupled to the motor portion so as to move forward or backward linearly according to an operation of the motor portion.

When the screw bar moves forward linearly due to driving of the motor portion, the monitor assembly may be tilted from the hinge bracket in a direction toward a passenger seat.

A first rotation fixing portion may be mounted on an end of the motor housing in a direction in which the hinge bracket is disposed, and a second rotation fixing portion may be mounted on an end of the screw bar in a direction in which the monitor bracket is disposed.

The first rotation fixing portion may be rotatably coupled to the third rotation support hole, and the second rotation fixing portion may be rotatably coupled to the third rotation support portion.

The tilting portion may include a first connection member configured to connect the pair of first rotation members and a second connection member configured to connect the pair of second rotation members.

The second connection member may be spaced at a distance apart from the drive member.

According to another aspect of the present invention, there is provided an AVN monitor drive unit for a vehicle. The AVN monitor drive unit includes a monitor assembly, a hinge bracket slidably disposed in the rear of the monitor assembly, a tilting portion configured to connect the monitor assembly and the hinge bracket to each other and to tilt the monitor assembly from the hinge bracket, a hinge housing disposed in the rear of the monitor assembly and configured to cover the hinge bracket, and a cover member disposed in the rear of the monitor assembly and fixed to a center fascia of a vehicle.

The cover member may include a monitor cover covering a rear of the monitor assembly and an operation portion cover having a quadrangular frame shape and extending rearward from a rear surface of the monitor cover so as to cover the hinge housing.

The above-described configurations and operations of the present invention will become more apparent from embodiments described in detail below with reference to the drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF THE INVENTION

The embodiments of the present invention are provided to more completely explain the present invention to one of ordinary skill in the art. The embodiments of the present invention may be changed in a variety of shapes, and the scope of the present invention is not limited to the following embodiments. The embodiments are provided to make the present disclosure more substantial and complete and to completely transfer the concept of the present invention to those skilled in the art. Also, respective components in the following drawings are exaggerated for convenience and clarity of description and like reference numerals refer to like elements in the drawings. As used herein, the term "and/or" includes any and all combinations or one of a plurality of associated listed items.

The terms are used herein to explain particular embodiments and not intended to limit the present invention.

As used herein, singular expressions, unless definitely defined otherwise in context, include plural expressions. Also, the terms such as "comprise" and/or "comprising" specify the presence of a shape, a number, an operation, a member, an element, and/or a group thereof and do not exclude the presence or addition of one or more other shapes, numbers, operations, members, elements, and/or groups.

Hereinafter, exemplary embodiments of the present invention will be described in detail with reference to the accompanying drawings.

Figure 1:
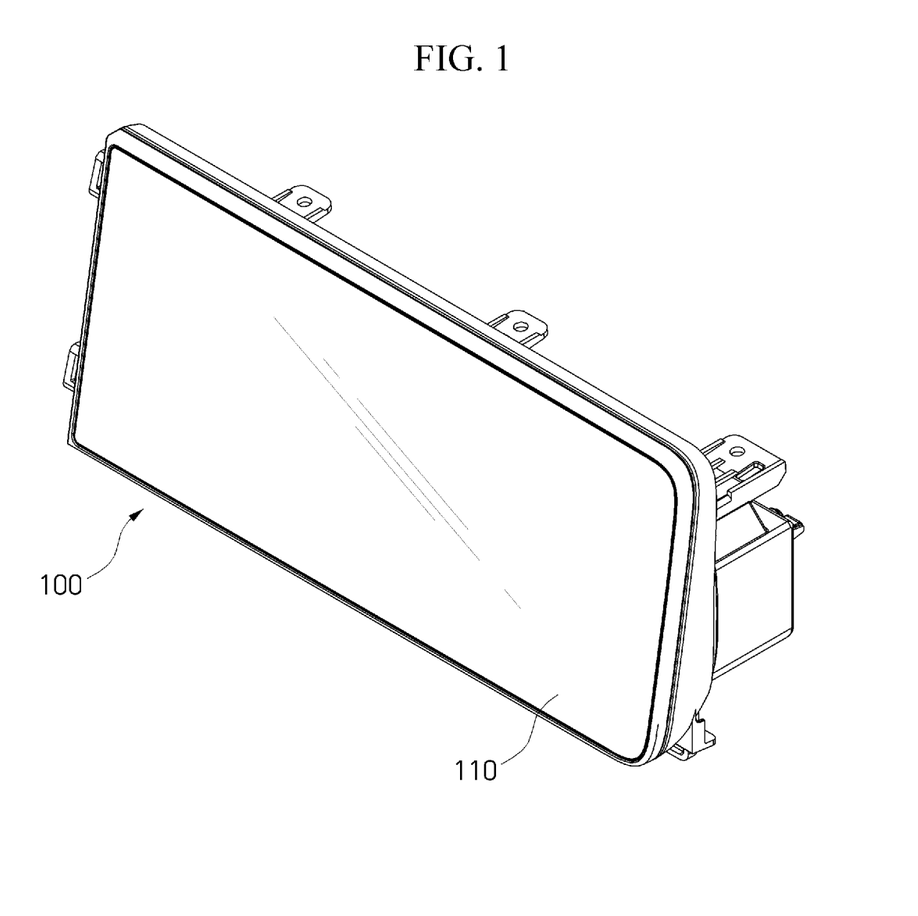
FIG. 1 is a perspective view illustrating one direction of an audio-video-navigation (AVN) monitor drive unit for a vehicle according to the present invention.
Figure 2:
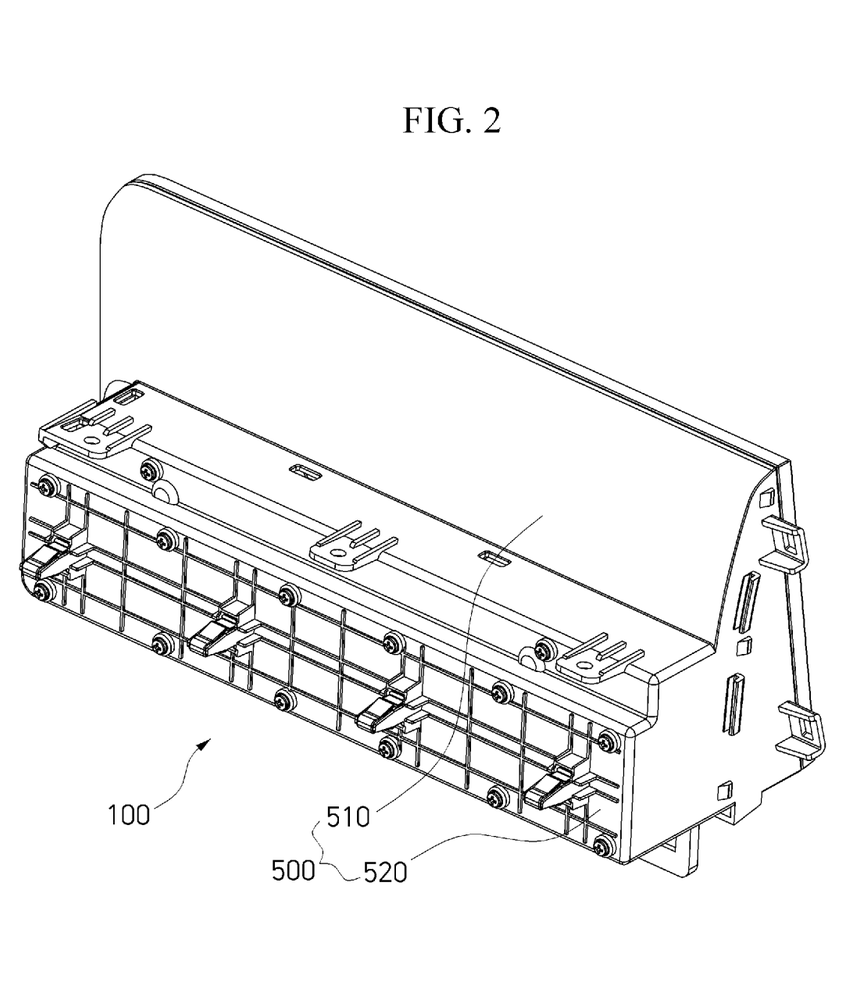
FIG. 2 is a perspective view illustrating the other direction of the AVN monitor drive unit according to the present invention.
Figure 3:
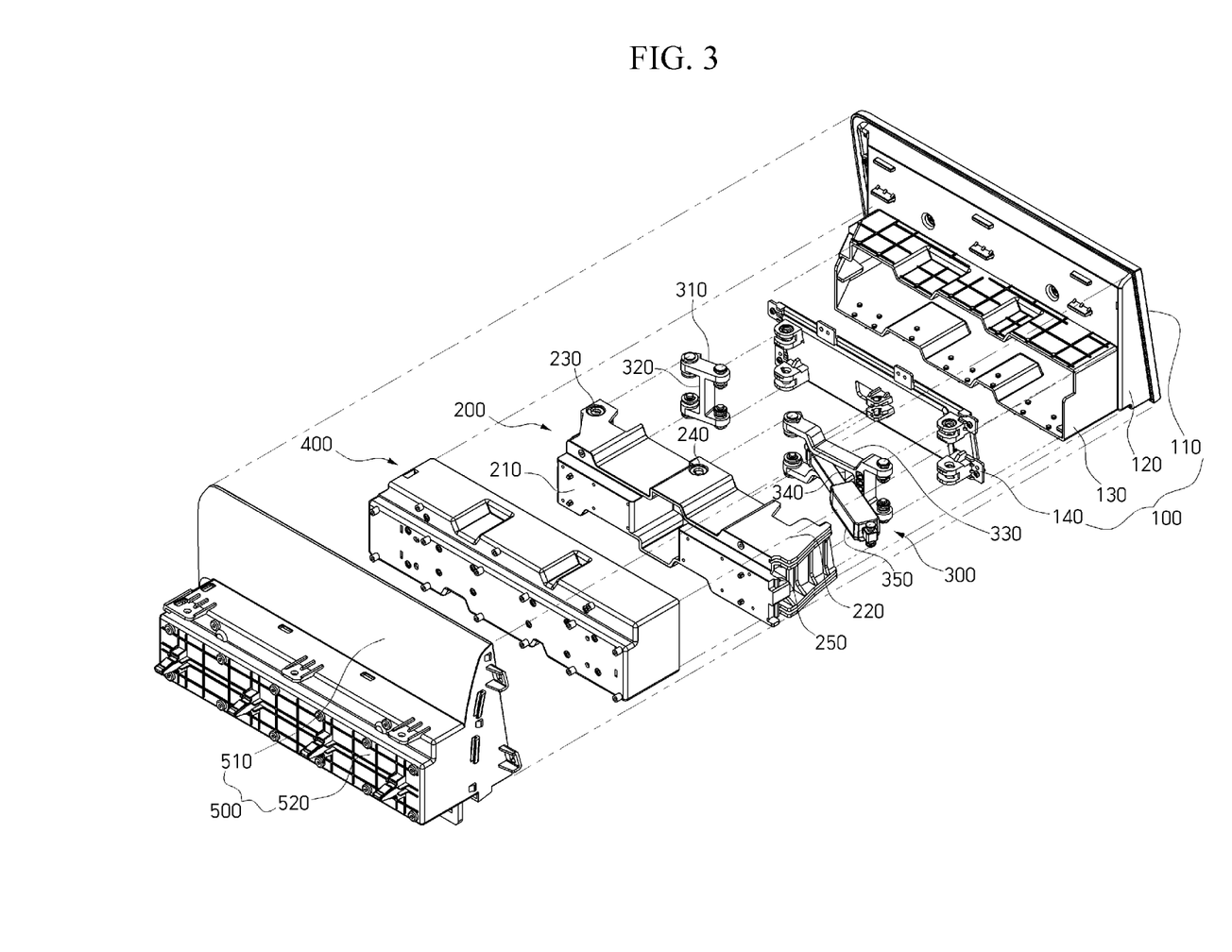
FIG. 3 is an exploded perspective view illustrating the AVN monitor drive unit according to the present invention.
Figure 4:
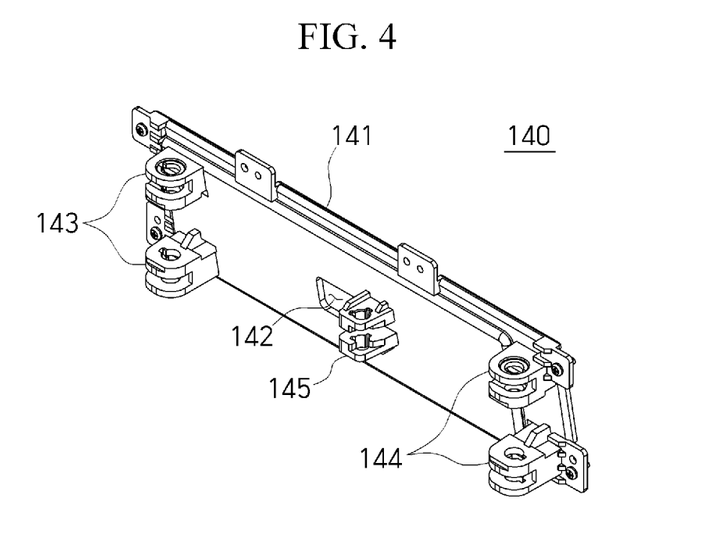
FIG. 4 is a perspective view illustrating a monitor bracket according to the present invention.
Figure 5:
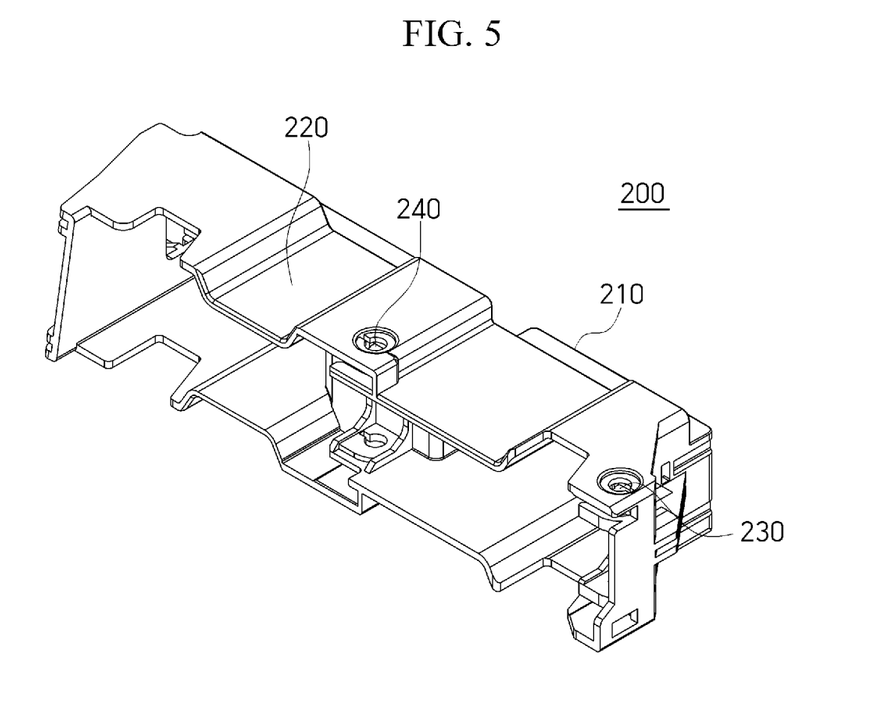
FIG. 5 is a perspective view illustrating a hinge bracket according to the present invention.
Figure 6:
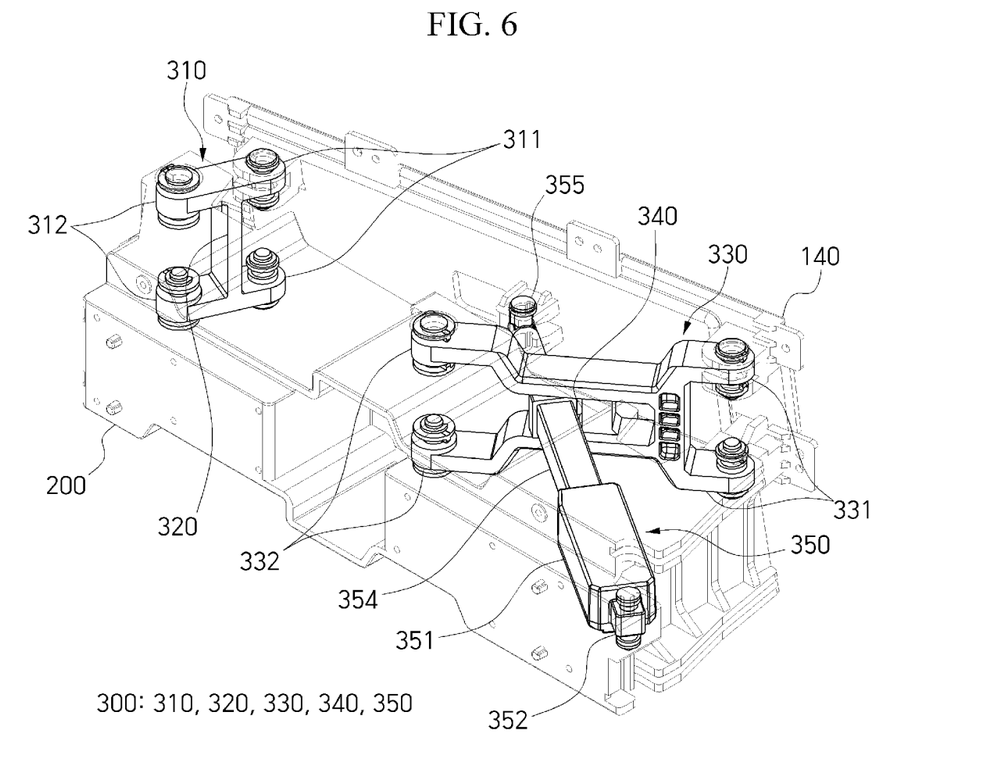
FIG. 6 is a perspective view illustrating the monitor bracket, the hinge bracket, and a tilting portion of the AVN monitor drive unit according to the present invention.
Figure 7:
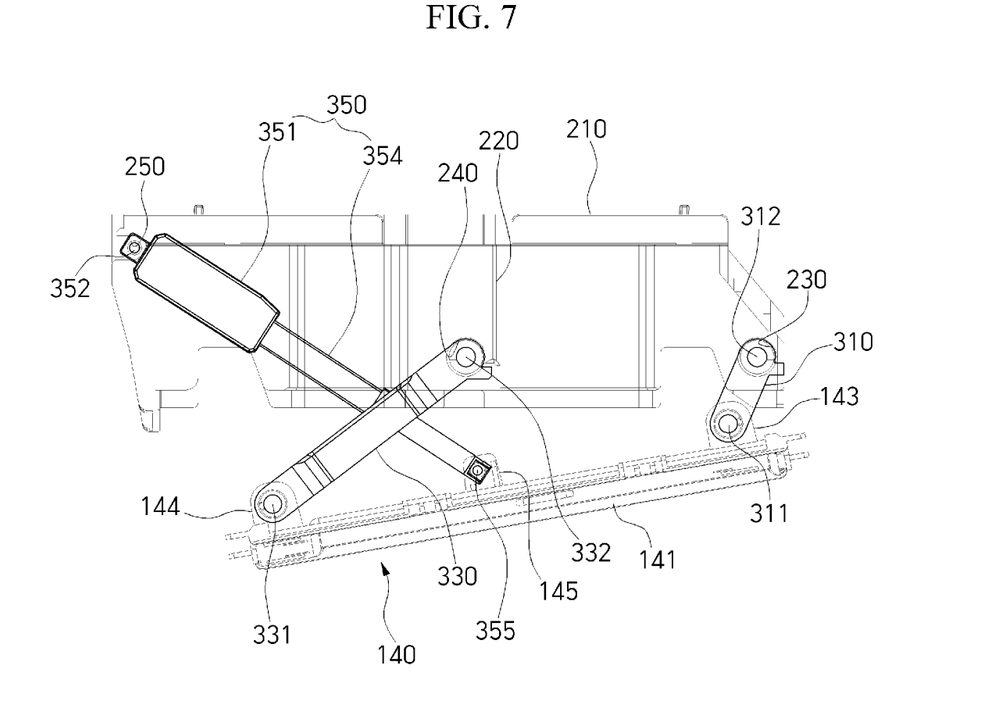
FIG. 7 is a plan view illustrating the monitor bracket, the hinge bracket, and a tilting portion of the AVN monitor drive unit according to the present invention.

FIG. 1 is a perspective view illustrating one direction of an audio-video-navigation (AVN) monitor drive unit for a vehicle according to the present invention. FIG. 2 is a perspective view illustrating the other direction of the AVN monitor drive unit according to the present invention. FIG. 3 is an exploded perspective view illustrating a monitor assembly according to the present invention. FIG. 4 is a perspective view illustrating a monitor bracket according to the present invention. FIG. 5 is a perspective view illustrating a hinge bracket according to the present invention. FIG. 6 is a perspective view illustrating the monitor bracket, the hinge bracket, and a tilting portion of the AVN monitor drive unit according to the present invention. FIG. 7 is a plan view illustrating the monitor bracket, the hinge bracket, and a tilting portion of the AVN monitor drive unit according to the present invention.

Referring to FIGS. 1 to 7, an AVN monitor drive unit for a vehicle according to one embodiment of the present invention includes a monitor assembly 100, a hinge bracket 200, a tilting portion 300, a hinge housing 400, and a cover member 500.

The monitor assembly 100 is a device for securing a driver's convenience. Particularly, the monitor assembly 100 according to one embodiment of the present invention is selectively tilted with respect to the hinge bracket 200 in a direction to a passenger seat to allow a passenger sitting in the passenger seat to easily manipulate the monitor assembly 100 as necessary.

The monitor assembly 100 includes a screen portion 110, a monitor frame 120, a bracket cover 130, and a monitor bracket 140.

The screen portion 110 is an output portion configured to display audio and visual or navigation system-related information to allow a driver to visually recognize necessary information with ease.

Also, the screen portion 110 is electrically connected to a connector configured to receive an external signal and receives the external signal through the connector so as to output a variety of pieces of information such as audio and visual or navigation system-related information.

The monitor frame 120 is positioned at a rear of the screen portion 110 and accommodates the screen portion 110 so as to protect the screen portion 110 from foreign matter or external force from the outside.

The bracket cover 130 has a quadrangular frame shape and extends rearwardly from a rear surface of the monitor frame 120.

The monitor bracket 140 is formed as a quadrangular panel overall, is disposed inside the bracket cover 130, and is mounted on a rear surface of the screen portion 110.

Also, the tilting portion 300 is coupled to the monitor bracket 140.

Meanwhile, a communication hole configured to communicate with the bracket cover 130 having the quadrangular frame shape is formed at the rear surface of the monitor frame 120.

The communication hole has a shape corresponding to the bracket cover 130.

The communication hole exposes the monitor bracket 140 mounted on the rear surface of the screen portion 110 outward from the monitor frame 120.

Accordingly, the monitor bracket 140 may be easily coupled to the tilting portion 300 through the communication hole.

The monitor bracket 140 includes a first base portion 141, a first rotation support portion 143, a second rotation support portion 144, and a third rotation support portion 145.

The first base portion 141 forms a body of the monitor bracket 140 and has a quadrangular panel shape.

A through-hole 142 is formed in the first base portion 141.

The through-hole 142 is a hole formed in the first base portion 141 between the first rotation support portion 143 and the third rotation support portion 145.

The connector which is electrically connected to the screen portion 110 and transmits the external signal to the screen portion 110 passes through the through-hole 142.

The first rotation support portion 143 is coupled to a rear surface of the first base portion 141, that is, a surface in a direction opposite to a direction in which the monitor assembly 100 is disposed.

Also, a pair of such first rotation support portions 143 are coupled to the rear surface of the first base portion 141 while being spaced apart from each other in a width direction, that is, a vertical direction of the first base portion 141 in FIG. 4.

The second rotation support portions 144 are coupled to the rear surface of the first base portion 141 at positions spaced apart from the first rotation support portions 143 in a longitudinal direction, that is, a horizontal direction of the first base portion 141 in FIG. 4.

The third rotation support portion 145 is coupled to the rear surface of the first base portion 141 between the first rotation support portions 143 and the second rotation support portions 144.

The first rotation support portions 143, the second rotation support portions 144, and the third rotation support portion 145 are coupled to the hinge bracket 200 with the tilting portion 300 as a medium.

The hinge bracket 200 is slidably positioned at the rear of the monitor assembly 100.

The hinge bracket 200 includes a second base portion 210, an extension portion 220, a first rotation support hole 230, a second rotation support hole 240, and a third rotation support hole 250.

The second base portion 210 forms a body portion of the hinge bracket 200 and has a quadrangular panel shape.

Also, the second base portion 210 is spaced rearward at a distance apart from the monitor assembly 100.

The second base portion 210 may be spaced at a depth of the bracket cover 130 formed of a quadrangular frame.

Also, an area of the second base portion 210 is smaller than an area of the communication hole of the monitor frame 120 and an area of the bracket cover 130.

Accordingly, the second base portion 210 may be easily housed or accommodated in the bracket cover 130 having the quadrangular frame shape.

The extension portion 220 has a quadrangular frame shape and extends from a perimeter of the second base portion 210 in the direction in which the monitor assembly 100 is disposed.

The extension portion 220 may be spaced by the depth of the bracket cover 130 formed of the quadrangular frame.

Also, the extension portion 220 is inserted into the bracket cover 130 having the quadrangular frame shape.

Accordingly, the monitor assembly 100 slides along the extension portion 220 to be tilted in a direction toward the passenger seat.

The first rotation support hole 230 includes a pair of holes formed in the extension portion 220 at respective positions corresponding to the first rotation support portions 143.

The second rotation support hole 240 includes a pair of holes formed in the extension portion 220 at positions spaced apart from the first rotation support hole 230 in a longitudinal direction, that is, a horizontal direction of the extension portion 220 in FIG. 5.

Referring to FIG. 7, the third rotation support hole 250 is formed in the extension portion 220 in a direction opposite to a direction in which the first rotation support hole 230 is disposed on the basis of the second rotation support hole 240.

The tilting portion 300 is coupled to the first rotation support portions 143, the second rotation support portions 144, the third rotation support portions 145, the first rotation support hole 230, the second rotation support hole 240, and the third rotation support hole 250.

The tilting portion 300 extends between and connects the monitor assembly 100 and the hinge bracket 200.

Also, the tilting portion 300 selectively tilts the monitor assembly 100 from the hinge bracket 200 when power is applied from the outside.

The tilting portion 300 includes a first rotation member 310, a first connection member 320, a second rotation member 330, a second connection member 340, and a drive member 350.

The first rotation member 310 has one end coupled to the first rotation support portion 143 of the monitor bracket 140 and the other end coupled to the first rotation support hole 230 of the hinge bracket 200.

Also, a pair of such first rotation members 310 are coupled to the first rotation support portions 143 spaced at a distance apart in a width direction on the rear surface of the first base portion 141 and are coupled to the first rotation support holes 230 spaced at a distance apart in a width direction on the extension portion 220.

The first rotation member 310 includes a first fixing portion 311 and a second fixing portion 312.

The first fixing portion 311 is formed on the one end of the first rotation member 310 and rotatably coupled to the first rotation support portion 143 of the monitor bracket 140.

Also, the second fixing portion 312 is formed on the other end of the first rotation member 310 and rotatably coupled to the first rotation support hole 230 of the hinge bracket 200.

The first connection member 320 connects middle parts of the pair of first rotation members 310.

Accordingly, the first rotation members 310 and the first connection member 320 form an H-shape overall.

The second rotation member 330 has one end coupled to the second rotation support portion 144 of the monitor bracket 140 and the other end coupled to the second rotation support hole 240 of the hinge bracket 200.

Also, a pair of such second rotation members 330 are coupled to the second rotation support portions 144 spaced at a distance apart in a width direction on the rear surface of the first base portion 141 and are coupled to the second rotation support holes 240 spaced at a distance apart in a width direction on the extension portion 220.

The second rotation member 330 includes a third fixing portion 331 and a fourth fixing portion 332.

The third fixing portion 331 is formed on the one end of the second rotation member 330 and rotatably coupled to the second rotation support portion 144 of the monitor bracket 140.

Also, the fourth fixing portion 332 is formed on the other end of the second rotation member 330 and rotatably coupled to the second rotation support hole 240 of the hinge bracket 200.

The second connection member 340 connects middle parts of the pair of second rotation members 330.

Accordingly, the second rotation members 330 and the second connection member 340 form an H-shape overall.

Meanwhile, a length of the first rotation member 310 is shorter than a length of the second rotation member 330.

Accordingly, when the monitor assembly 100 is selectively tilted by external power, as shown in FIGS. 6 and 7, a region of the monitor assembly 100 which is coupled to the second rotation members 330 may be tilted, by the length of the second rotation member 330, from a region coupled to the first rotation members 310 in a direction toward the passenger seat.

Accordingly, the first rotation members 310 are coupled in the direction toward the passenger seat, and the second rotation members 330 are coupled in a direction toward a driver seat.

Accordingly, the screen portion 110 of the monitor assembly 100 may be tilted toward a passenger sitting in the passenger seat.

The drive member 350 has one end coupled to the third rotation support portion 145 of the monitor bracket 140 and the other end coupled to the third rotation support hole 250 of the hinge bracket 200.

Also, the drive member 350 intersects with the pair of second rotation members 330 therebetween.

Accordingly, the second rotation members 330 and the drive member 350 are arranged in an X-shape in a plan view.

Also, the drive member 350 intersects with the pair of second rotation members 330 and is spaced at a distance apart from the second connection member 340 which connects the pair of second rotation members 330 to each other.

When external power is applied and the monitor assembly 100 is tilted in the direction toward the passenger seat, the drive member 350 may be selectively variable and space the monitor assembly 100 apart from the hinge bracket 200.

The drive member 350 includes a motor housing 351, a motor portion (not shown), and a screw bar 354.

The motor housing 351 is disposed between the pair of second rotation members 330.

Also, the motor housing 351 has one end rotatably coupled to the hinge bracket 200.

In detail, a first rotation fixing portion 352 is mounted on an end of the motor housing 351 in a direction in which the hinge bracket 200 is disposed.

Also, the first rotation fixing portion 352 is rotatably coupled to the third rotation support hole 250 of the hinge bracket 200.

The motor portion is accommodated or housed in the motor housing 351 and selectively generates a driving force when power is applied from the outside.

The screw bar 354 is accommodated or housed in the motor housing 351 to protrude in a direction toward the monitor bracket 140.

Also, the screw bar 354 has one end in a direction toward the monitor bracket 140 which is rotatably coupled to the monitor bracket 140 and the other end coupled to the motor portion.

In detail, a second rotation fixing portion 355 is mounted on an end of the screw bar 354 in a direction in which the monitor bracket 140 is disposed.

Also, the second rotation fixing portion 355 is rotatably coupled to the third rotation support portion 145 of the monitor bracket 140.

Accordingly, when a driving force is generated by the motor portion, the screw bar 354 moves forward or backward linearly from the motor housing 351.

That is, when the screw bar 354 moves in a perpendicular direction due to driving of the motor portion to which power is applied from the outside, the one end of the screw bar 354 pressurizes the monitor bracket 140 so that the monitor assembly 100 is tilted from the hinge bracket 200 in a direction toward the passenger seat.

The hinge housing 400 is disposed at a rear of the monitor assembly 100 and covers the hinge bracket 200.

The hinge housing 400 is coupled to the hinge bracket 200 using a bolt coupling method.

Also, the cover member 500 is disposed at the rear of the monitor assembly 100 and is fixed to a center fascia of the vehicle.

Accordingly, since the cover member 500 is fixed to the center fascia of the vehicle, when the screen portion 110 of the monitor frame 120 is tilted in a direction toward the passenger seat, the monitor frame 120 is tilted from the cover member 500.

Accordingly, when the monitor frame 120 is tilted from the cover member 500 in the direction toward the passenger seat, a region of the cover member 500 in a direction toward the driver seat is opened.

Also, after manipulation of the passenger sitting in the passenger seat is completed, when manipulation of the driver sitting in the driver seat is necessary and the monitor assembly 100 is returned to an original position, the monitor assembly 100 seals the cover member 500.

Accordingly, the monitor assembly 100 including the screen portion 110 displaying audio and visual or navigation system-related information to allow the driver to visually recognize necessary information with ease is tilted from the cover member 500 in the direction toward the passenger seat so that the passenger sitting in the passenger seat may easily watch and manipulate an AVN monitor.

The cover member 500 includes a monitor cover 510 and an operation portion cover 520.

The monitor cover 510 covers the rear of the monitor assembly 100, and the operation portion cover 520 has a quadrangular frame shape and extends rearwardly from a rear surface of the monitor cover 510 and covers the hinge housing 400.

Hereinafter, an operational relationship of the AVN monitor drive unit according to one embodiment of the present invention will be described in detail with reference to the drawings.

Figure 8:
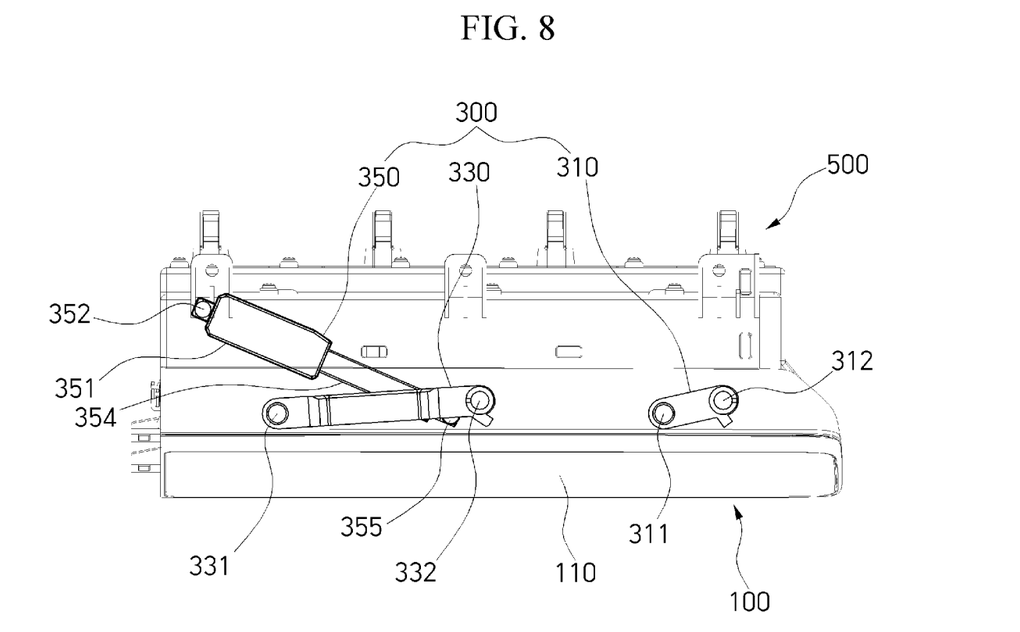
FIGS. 8 and 9 are operational views illustrating an operational state of the AVN monitor drive unit according to the present invention.
Figure 9:
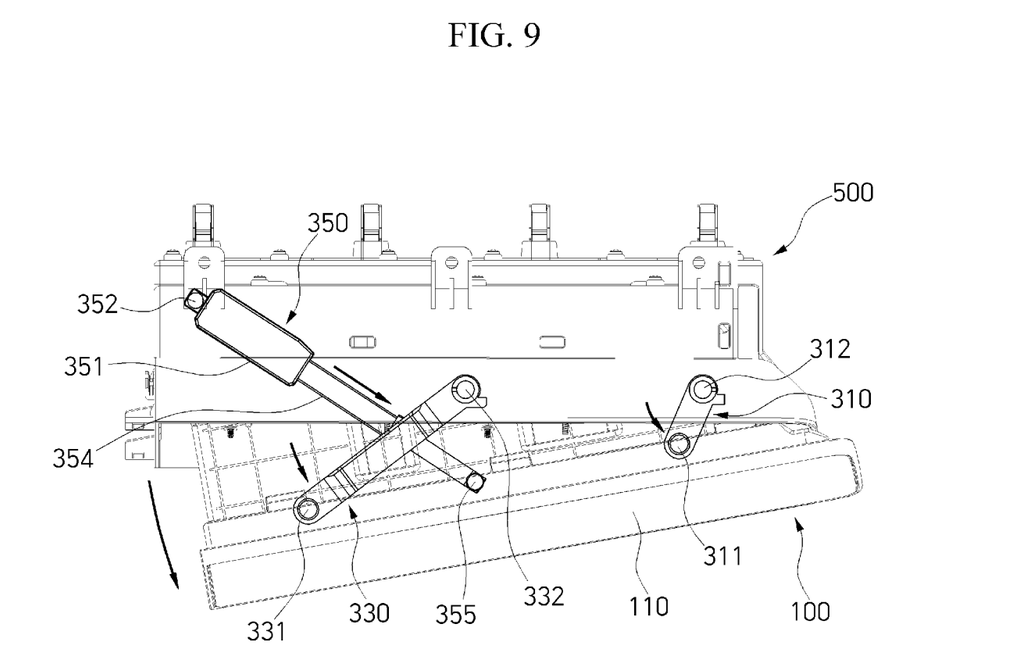
Figure 10:
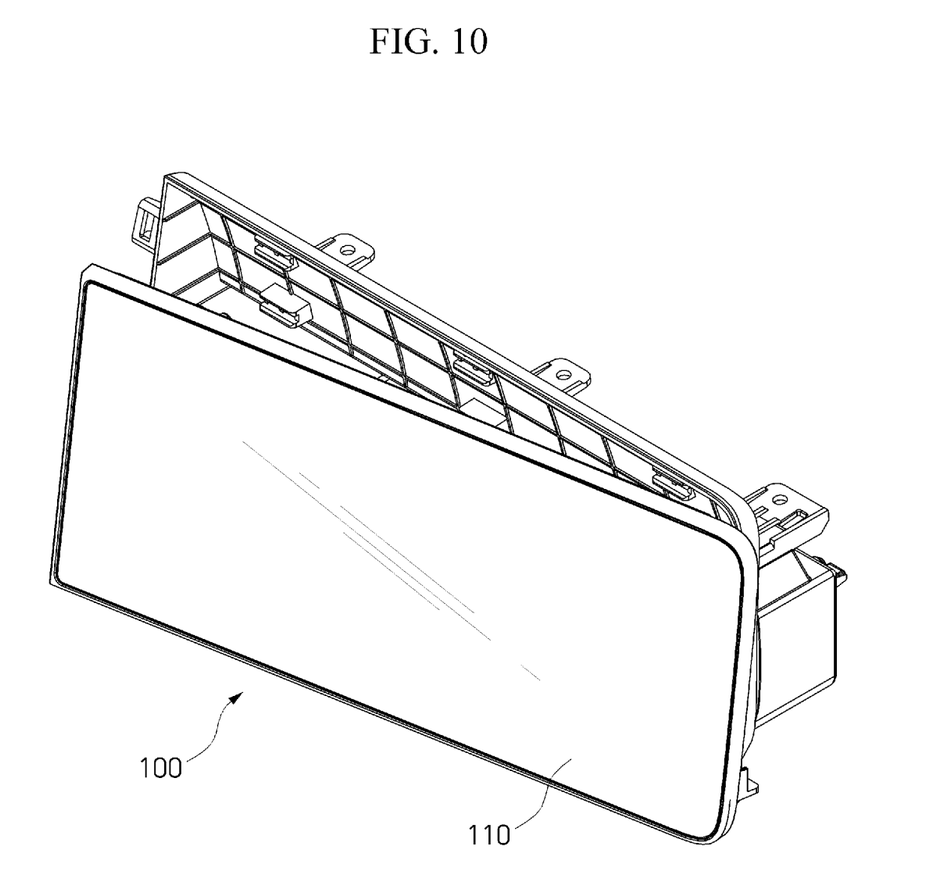
FIG. 10 is a perspective view illustrating a state in which a monitor assembly of the AVN monitor drive unit according to the present invention is tilted.

FIGS. 8 and 9 are operational views illustrating an operational state of the AVN monitor drive unit according to the present invention, and FIG. 10 is a perspective view illustrating a state in which the monitor assembly of the AVN monitor drive unit according to the present invention is tilted.

First, referring to FIGS. 7 and 8, in an initial state, the monitor assembly 100 is disposed in a position where the driver easily manipulates the screen portion 110 while the cover member 500 is sealed.

Also, referring to FIGS. 7 and 9, when the motor portion of the drive member 350 is driven to be used by the passenger sitting in the passenger seat, the screw bar 354 coupled to the motor portion moves forward linearly.

The screw bar 354 which has moved forward linearly pressurizes the monitor bracket 140 of the monitor assembly 100 to allow the monitor assembly 100 to be tilted from the cover member 500 in a direction toward the passenger sitting in the passenger seat.

Here, the second rotation fixing portion 355 of the screw bar 354 rotates from the third rotation support portion 145 of the monitor bracket 140.

Simultaneously, the first rotation member 310 and the second rotation member 330 of the tilting portion 300 rotate counterclockwise on the basis of the second fixing portion 312 and the fourth fixing portion 332 in the drawings.

Particularly, in the monitor assembly 100, the length of the first rotation member 310 disposed in a direction toward the passenger seat is formed to be shorter than the length of the second rotation member 330 so that the monitor assembly 100 rotates as much as the length of the second rotation member 330.

Accordingly, as shown in FIG. 10, the monitor assembly 100 may be tilted from the cover member 500 in the direction toward the passenger sitting in the passenger seat on the basis of the first fixing portion 311 of the first rotation member 310.

According to the present invention, since a first rotation member coupled in a direction toward a passenger seat has a length shorter than a second rotation member coupled in a direction toward a driver seat, when a monitor assembly is selectively tilted by external power, a region of the monitor assembly which is coupled to the second rotation member is tilted in the direction toward the passenger seat by as much as a length of the second rotation member from a region of the monitor assembly which is coupled to the first rotation member.

Accordingly, since a screen portion of the monitor assembly is tiltable toward a passenger sitting in the passenger seat, the passenger sitting in the passenger seat may easily watch and manipulate an AVN monitor.

As described above, the embodiments disclosed in the specification should be considered not as a limitative view but as an exemplary view for explanation. The scope of the present invention will be shown in the claims, not in the above description, and all differences within an equivalent range thereof should be construed as being included in the present invention.

What is claimed is:

1. An audio-video-navigation (AVN) monitor drive unit for a vehicle, comprising:
   a monitor assembly having front and rear sides respectively facing in mutually opposed directions and including a screen disposed on the front side of the monitor assembly;
   a hinge bracket attached to the rear side of the monitor assembly; and
   a tilting portion disposed on the rear side of the monitor assembly, extending between and rotatably coupled to the monitor assembly and the hinge bracket such that the monitor assembly is tilted with respect to the hinge bracket,
   wherein the tilting portion comprises:
      a first rotation member rotatably coupled between the monitor assembly and the hinge bracket;
      a second rotation member rotatably coupled between the monitor assembly and the hinge bracket and spaced apart from the first rotation member; and
      a drive member rotatably coupled between the monitor assembly and the hinge bracket, intersecting the second rotation member, and having a length variable to tilt the monitor assembly with respect to the hinge bracket.

2. The AVN monitor drive unit of claim 1, wherein:
   the screen is electrically connected to a connector and configured to receive an external signal from the connector and display an image based on the received external signal, and
   the monitor assembly comprises:
      a monitor frame positioned at a rear of the screen and configured to accommodate the screen;
      a bracket cover having a quadrangular frame shape and extending rearwardly from a rear surface of the monitor frame; and
      a monitor bracket positioned in the bracket cover and mounted on a rear surface of the screen.

3. The AVN monitor drive unit of claim 2, wherein the monitor frame contains a first through-hole positioned corresponding to a second through-hole of the bracket cover and a third through-hole of the monitor bracket outward.

4. The AVN monitor drive unit of claim 2, wherein the monitor bracket comprises:
   a first base portion forming a first body;
   a pair of first rotation support portions positioned on a rear surface of the first base portion and spaced apart from each other in a width direction of the first base portion;
   a pair of second rotation support portions positioned on the rear surface of the first base portion, spaced apart from each other in the width direction of the first base portion, and spaced apart from the pair of first rotation support portions in a longitudinal direction of the first base portion; and
   a third rotation support portion positioned on the rear surface of the first base portion and positioned between the pair of first rotation support portions and the pair of second rotation support portions in the width direction of the first base portion.

5. The AVN monitor drive unit of claim 4, wherein a through-hole is positioned at the first base portion between the pair of first rotation support portions and the third rotation support portion in the longitudinal direction of the first base portion, the connector passing through the through-hole.

6. An audio-video-navigation (AVN) monitor drive unit for a vehicle, comprising:
a monitor assembly;
a hinge bracket slidably positioned at a rear of the monitor assembly; and
a tilting portion extending between and rotatably coupled to the monitor assembly and the hinge bracket such that the monitor assembly is tilted with respect to the hinge bracket,
wherein the monitor assembly comprises:
a screen electrically connected to a connector and configured to receive an external signal from the connector and display an image based on the received external signal;
a monitor frame positioned at a rear of the screen and configured to accommodate the screen;
a bracket cover having a quadrangular frame shape and extending rearwardly from a rear surface of the monitor frame; and
a monitor bracket positioned in the bracket cover and mounted on a rear surface of the screen,
wherein the monitor bracket comprises:
a first base portion forming a first body;
a pair of first rotation support portions positioned on a rear surface of the first base portion and spaced apart from each other in a width direction of the first base portion;
a pair of second rotation support portions positioned on the rear surface of the first base portion, spaced apart from each other in the width direction of the first base portion, and spaced apart from the pair of first rotation support portions in a longitudinal direction of the first base portion; and
a third rotation support portion positioned on the rear surface of the first base portion and positioned between the pair of first rotation support portions and the pair of second rotation support portions in the width direction of the first base portion,
wherein a through-hole is positioned at the first base portion between the pair of first rotation support portions and the third rotation support portion in the longitudinal direction of the first base portion, the connector passing through the through-hole,
wherein the hinge bracket comprises:
a second base portion forming a second body and positioned at a rear of and spaced apart from the monitor assembly; and
an extension portion extending from a circumference of the second base portion, and
wherein the hinge bracket contains:
a pair of first rotation support holes positioned at a pair of first portions of the extension portion corresponding to the pair of first rotation support portions;
a pair of second rotation support holes positioned at a pair of second portions of the extension portion spaced apart from the pair of first rotation support holes in a longitudinal direction of the second base portion; and
a third rotation support hole positioned at a pair of third portions of the extension portion in a first direction opposite to a second direction in which the pair of first rotation support holes is positioned with respect to the pair of second rotation support holes.

7. The AVN monitor drive unit of claim 6, wherein:
the extension portion is inserted into the bracket cover, and
the monitor assembly is configured to slide along the extension portion.

8. The AVN monitor drive unit of claim 6, wherein the tilting portion comprises:
a pair of first rotation members, each first rotation member having a first end coupled to a different one of the first rotation support portions and a second end coupled at a different one of the pair of first rotation support holes;
a pair of second rotation members, each second rotation member having a first end coupled to a different one of the second rotation support portions and a second end coupled at a different one of the second rotation support holes; and
a drive member having a first end coupled at the third rotation support portion and a second end coupled to the third rotation support hole.

9. The AVN monitor drive unit of claim 8, wherein the pair of first rotation members is shorter than the pair of second rotation members.

10. The AVN monitor drive unit of claim 8, wherein the drive member is configured to selectively position the monitor assembly at a distance from the hinge bracket.

11. The AVN monitor drive unit of claim 8, wherein the pair of first rotation members comprises:
a pair of first fixing portions rotatably coupled to the pair of first rotation support portions, respectively; and
a pair of second fixing portions rotatably coupled at the pair of first rotation support holes, respectively.

12. The AVN monitor drive unit of claim 8, wherein the pair of second rotation members comprises:
a pair of first fixing portions rotatably coupled to the pair of second rotation support portions, respectively; and
a pair of second fixing portions rotatably coupled at the pair of second rotation support holes, respectively.

13. The AVN monitor drive unit of claim 10, wherein the drive member comprises:
a motor housing positioned between the pair of second rotation members and having one end rotatably coupled to the hinge bracket;
a motor housed in the motor housing; and
a screw bar housed in the motor housing, coupled to the motor, and configured to linearly move forward or backward in response to an operation of the motor.

14. The AVN monitor drive unit of claim 13, wherein the monitor assembly is configured to tilt from the hinge bracket toward a passenger seat when the screw bar moves forward.

15. The AVN monitor drive unit of claim 13, wherein:
a first rotation fixing portion is mounted on an end of the motor housing, and
a second rotation fixing portion is mounted on an end of the screw bar.

16. The AVN monitor drive unit of claim 15, wherein:
the first rotation fixing portion is rotatably coupled at the third rotation support hole, and
the second rotation fixing portion is rotatably coupled to the third rotation support portion.

17. The AVN monitor drive unit of claim 8, wherein the tilting portion comprises:
a first connection member coupled to the pair of first rotation members; and
a second connection member coupled to the pair of second rotation members.

18. The AVN monitor drive unit of claim 17, wherein the second connection member is spaced apart from the drive member.

19. An audio-video-navigation (AVN) monitor drive unit for a vehicle, comprising:
- a monitor assembly having front and rear sides respectively facing in mutually opposed directions and having a screen disposed on the front side of the monitor assembly;
- a hinge bracket attached to the rear side of the monitor assembly;
- a tilting portion disposed on the rear side of the monitor assembly, extending between and rotatably coupled to the monitor assembly and the hinge bracket such that the monitor assembly is tilted with respect to the hinge bracket;
- a hinge housing positioned at the rear side of the monitor assembly and configured to cover the hinge bracket; and
- a cover member positioned at the rear side of the monitor assembly and fixed to a dashboard of a vehicle, wherein the tilting portion comprises:
- a first rotation member rotatably coupled between the monitor assembly and the hinge bracket;
- a second rotation member rotatably coupled between the monitor assembly and the hinge bracket and laterally spaced apart from the first rotation member; and
- a drive member rotatably coupled between the monitor assembly and the hinge bracket, intersecting the second rotation member, and having a length variable to tilt the monitor assembly with respect to the hinge bracket.

20. The AVN monitor drive unit of claim 19, wherein the cover member comprises:
- a monitor cover covering the rear side of the monitor assembly; and
- an operation portion cover having a quadrangular frame shape and extending rearwardly from a rear surface of the monitor cover to cover the hinge housing.

* * * * *